United States Patent
Xu

(10) Patent No.: US 10,969,302 B1
(45) Date of Patent: Apr. 6, 2021

(54) OPTICAL TIME-DOMAIN REFLECTOMETERS AND RELATED METHODS

(71) Applicant: AFL Telecommunications LLC, Duncan, SC (US)

(72) Inventor: Fang Xu, Auburndale, MA (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 16/790,205

(22) Filed: Feb. 13, 2020

(51) Int. Cl.
*G01N 21/00* (2006.01)
*G01M 11/00* (2006.01)

(52) U.S. Cl.
CPC ................ *G01M 11/3109* (2013.01)

(58) Field of Classification Search
CPC ........... G01M 11/3145; G01M 11/335; G01M 11/33; G01M 11/3109; G01M 11/338
USPC ........................................................ 356/73.1
See application file for complete search history.

(56) References Cited

U.S. PATENT DOCUMENTS

| | | | |
|---|---|---|---|
| 9,182,253 B2* | 11/2015 | Courchaine | G01D 5/268 |
| 9,772,238 B2* | 9/2017 | Preston | G01L 1/242 |
| 10,110,302 B2* | 10/2018 | Mansouri Rad | H04B 10/0771 |
| 2011/0153544 A1* | 6/2011 | Nagel | G01M 11/3136 |
| | | | 706/54 |

* cited by examiner

*Primary Examiner* — Md M Rahman
(74) *Attorney, Agent, or Firm* — Dority & Manning, P.A.

(57) ABSTRACT

A method of testing an optical network with an optical time-domain reflectometer includes determining a reference power of the optical time-domain reflectometer based on a power level of a reflected light pulse reflected from an optical reflector. After determining the reference power, the method includes connecting the optical time-domain reflectometer to one end of the optical network and connecting the optical reflector to an opposite end of the optical network. The method also includes determining a return power through the optical network based on a power level of a reflected light pulse reflected through the optical network from the optical reflector to the optical time-domain reflectometer. The method further includes determining a loss of the optical network based on the reference power and the return power.

20 Claims, 7 Drawing Sheets

OPTICAL TIME-DOMAIN REFLECTOMETERS AND RELATED METHODS

FIELD

The present disclosure relates generally to methods of testing optical networks and optical devices with optical time-domain reflectometers, including methods of determining loss of an optical network with an optical time-domain reflectometer.

BACKGROUND

Testing of fiber optic cables and fiber optic networks generally requires multiple steps with different hardware, e.g., test instruments, used in different steps. Generally, a loss test is performed with a separate light source and power meter in one step and a map or trace of the fiber optic cable or network is captured with an optical time-domain reflectometer in another step.

Light source power meter methods are generally known and utilized in the fiber optics industry to measure the insertion losses of the optical fibers in fiber optic cables. Typically, a fiber optic cable, network, or other system under test may be connected between two test cables. One test cable is connected to a light source, and the other test cable is connected to a power meter. Light is transmitted from the light source through the test cables and fiber optic cable to the power meter, and the loss in an optical fiber of the fiber optic cable is determined based on the measured power at the power meter and the power measured by referencing the light source to the power meter directly.

A fiber optic network can be as short as a few meters or as long as tens of kilometers. Monitoring both ends, particularly, of multi kilometer fiber optic networks typically requires at least two people, as well as additional time and expenses associated therewith.

An optical time-domain reflectometer ("OTDR" or "device") is typically connected to one end of an optical system (e.g., cable, network, etc.) under test and transmits pulsed light signals along the fiber. The optical time-domain reflectometer records reflected light as a function of time, called an OTDR trace or simply a trace. The trace is used by software to detect reflections, e.g., fiber backscattering of the pulsed light signals due to discontinuities or intensity changes within the optical system, such as connectors, breaks, splices, splitters, or bends in the optical fiber, generally called events. The optical time-domain reflectometer analyzes the detected reflected light signal with respect to time in order to locate such events along the length of the optical fiber. The results of such analysis may be output as a table of events of the optical system.

Further, optical time-domain reflectometers may be used to measure end-to-end loss of the optical system by comparing fiber backscatter levels at both ends. However, conventional methods of using an optical time-domain reflectometer to measure loss depend on the accuracy of the fiber backscatter coefficients. Therefore, conventional OTDR methods are less accurate than measuring loss using a separate light source and power meter on opposite ends of the optical system. Thus, as mentioned, complete and accurate testing of an optical system generally requires multiple steps with different test instruments used in different steps, e.g., loss testing with a light source and power meter and event tracing with an optical time-domain reflectometer.

Moreover, an OTDR trace captured on one side of the network is not a complete representation of the network under test. When light is transmitted from one section of fiber to another section, the trace can reflect the loss in addition to a backscatter coefficient of each section. To determine the true loss, an OTDR trace captured from opposite directions is needed. The true loss can then be calculated by averaging the values of the two different losses captured from both directions. However, and as previously described, this is typically more time consuming and expensive and requires people positioned at opposite ends of the network.

The use of separate test instruments or repetitive measurements is time consuming, cumbersome, and may result in damage to the optical connector on the fiber span under test and/or the test port optical connector.

Integrated versions of the two previously described methods use optical multiplexers to connect different test hardware sequentially in order to avoid manual switching of different test instruments. As previously noted, this requires at least two people to complete the job—a first person at a first end of the optical system and a second person at a second end of the optical system.

Accordingly, improved testing devices and methods for optical fibers are desired. In particular, testing devices and methods that reduce or eliminate the requirement for multiple separate instruments, that eliminate the necessity of a second person, and that thus reduce the associated time and risk involved in such testing, would be advantageous.

BRIEF DESCRIPTION

Aspects and advantages of the invention will be set forth in part in the following description, or may be obvious from the description, or may be learned through practice of the invention.

In accordance with one aspect, the present disclosure is directed to a method of testing an optical network with an optical time-domain reflectometer. The method includes determining a reference power. The method also includes connecting the optical time-domain reflectometer to the optical network at a first end of the optical network and connecting an optical reflector to the optical network at a second end of the optical network opposite the first end of the optical network. The method further includes transmitting a light pulse from a light source of the optical time-domain reflectometer through the optical network to the optical reflector and measuring a power level of a reflected light pulse reflected from the optical reflector through the optical network to the optical time-domain reflectometer with an optical power meter of the optical time-domain reflectometer. The method also includes determining a loss of the optical network based on the measured power level of the reflected light pulse and the reference power.

In accordance with another aspect, the present disclosure is directed to a method of testing an optical network with an optical time-domain reflectometer. The method includes determining a reference power of the optical time-domain reflectometer based on a power level of a reflected light pulse reflected from an optical reflector. After determining the reference power, the method includes connecting the optical time-domain reflectometer to one end of the optical network and connecting the optical reflector to an opposite end of the optical network. The method also includes determining a return power through the optical network based on a power level of a reflected light pulse reflected through the optical network from the optical reflector to the optical time-domain reflectometer. The method further includes determining a loss of the optical network based on the reference power and the return power.

In accordance with another aspect, the present disclosure is directed to an optical time-domain reflectometer. The optical time-domain reflectometer includes a light source, an optical power meter, and a controller. The controller is configured for determining a reference power based on a power level of a reflected light pulse reflected from an optical reflector. The controller is also configured for transmitting a light pulse from a light source of the optical time-domain reflectometer through an optical network to the optical reflector. The controller is further configured for measuring a power level of a reflected light pulse reflected from the optical reflector through the optical network to the optical time-domain reflectometer with an optical power meter of the optical time-domain reflectometer. The controller is also configured for determining a loss of the optical network based on the measured power level of the reflected light pulse reflected through the optical network and the reference power.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
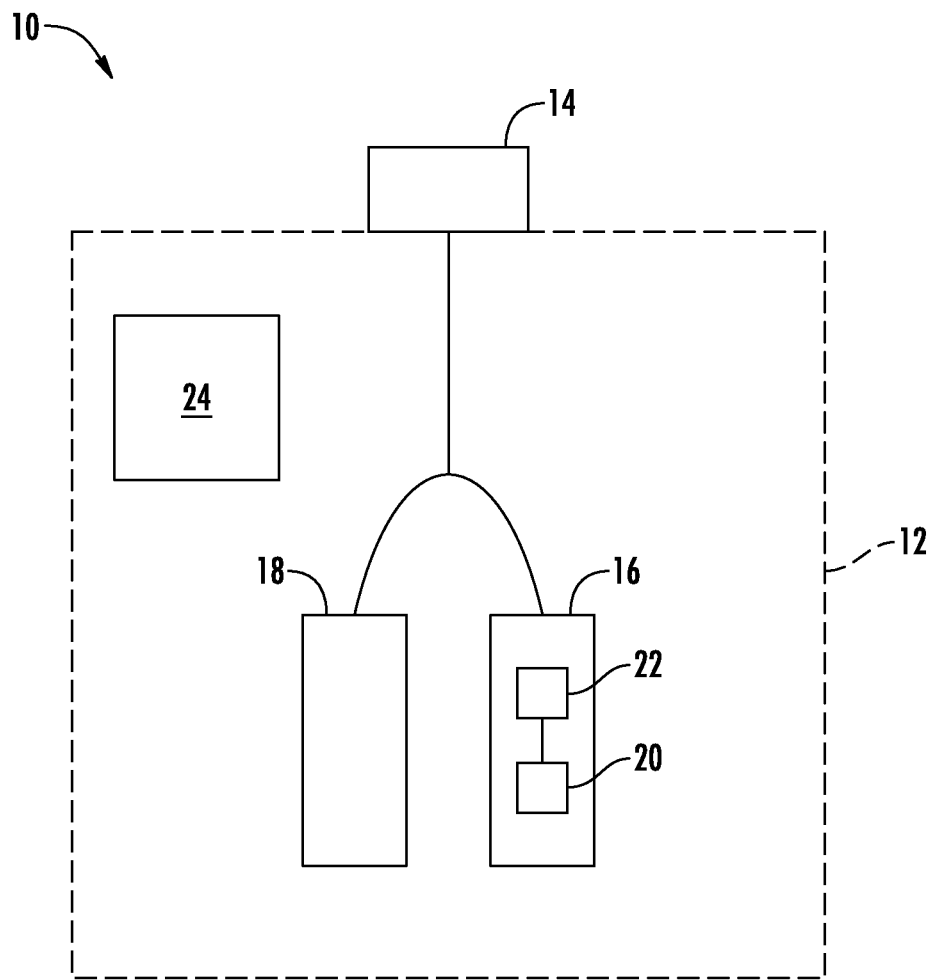
FIG. 1 provides a schematic illustration of an optical time-domain reflectometer in accordance with one or more example embodiments of the present disclosure.

Reference now will be made in detail to embodiments of the invention, one or more examples of which are illustrated in the drawings. Repeat use of reference characters in the present specification and drawings is intended to represent the same or analogous features or elements of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and do not necessarily signify sequence or importance of the individual components. As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the term "direction" refers to the direction of light travelling from the light source with respect to the media of transmission. In this regard, light travelling in a first direction includes light travelling along the media of transmission before hitting a reflector, such as a mirror, a fiber break, an open UPC connector, or even a micro structure of the transmission media itself. Light travelling in a second direction includes light travelling along the media of transmission after hitting the reflector. The "direction" does not change according to the shape of the transmission media. For instance, the direction does not change when the optical fiber is bent.

Referring now to the Figures, the present disclosure is generally directed to methods and devices which advantageously facilitate improved testing of optical systems, such as optical fibers or fiber optic networks containing multiple optical fibers, including an exemplary optical time-domain reflectometer (OTDR) 10 and methods of using the OTDR for complete testing of an optical system. Referring to FIG. 1, for example, the OTDR 10 may include a casing or housing 12 with a light source 16 and a measurement element 18. The measurement element 18 may be configured to make a measurement of light within the optical system, for example, the measurement element 18 may be an optical power meter. In some embodiments, the light source 16 and the measurement element 18 may be disposed within the housing 12. The light source 16 and the measurement element 18 may be connected to a test port 14 by an optical branching device (which may for example include a splitter and/or other suitable device, such as optical fiber couplers, circulator, etc., for providing such branching). Thus, the light source 16 and the measurement element 18 are both in optical communication with the test port 14 of the OTDR 10 via the optical branching device. As illustrated for example in FIG. 1, the test port 14 may be at least partially external to the housing 12. The test port 14 may be a contact-based port or contactless port, and a suitable connector of a suitable cable as discussed herein may be connected to the port to facilitate optical coupling with the OTDR 10. In at least some embodiments, the light source 16 may include a pulse generator 20 and a laser 22 which is driven by the pulse generator 20 such that the light source 16 may be operable to emit light pulses as is generally understood in the art. In some embodiments, the measurement element 18 of the OTDR 10 may include an avalanche photodiode, as is understood by those of ordinary skill in the art.

The OTDR 10 may further include a controller 24. The controller 24 may be in communication with other components of the OTDR 10, including the light source 16 and the measurement element 18. Controller 24 may be configured and operable to cause such other components to perform the various operations and method steps as discussed herein.

Controller 24 may generally comprise a computer or any other suitable processing unit. For example, the controller 24 may include one or more processor(s) and associated memory device(s) configured to perform a variety of computer-implemented functions, as discussed herein. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) of the controller 24 may generally comprise local memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements including remote storage, e.g., in a network cloud. Such memory device(s) may generally be configured to store suitable computer-readable instructions that, when implemented by the processor(s), configure the controller 24 to perform various computer-implemented functions including, but not limited to, performing the various steps discussed herein. In addition, the controller 24 may also include various input/output channels for receiving inputs from and for sending control signals to the various other components of the OTDR 10, including the light source 16 and the measurement element 18.

In various embodiments, the present disclosure is directed to methods of testing an optical system including one or more optical fibers, such as a fiber optic cable or a fiber optic network (e.g., a network comprising one or more cables, at least some of which are fiber optic cables) with an OTDR. It should be understood that in exemplary embodiments, the controller 24 may be utilized to perform some or all of the various method steps as discussed herein.

Figure 2:
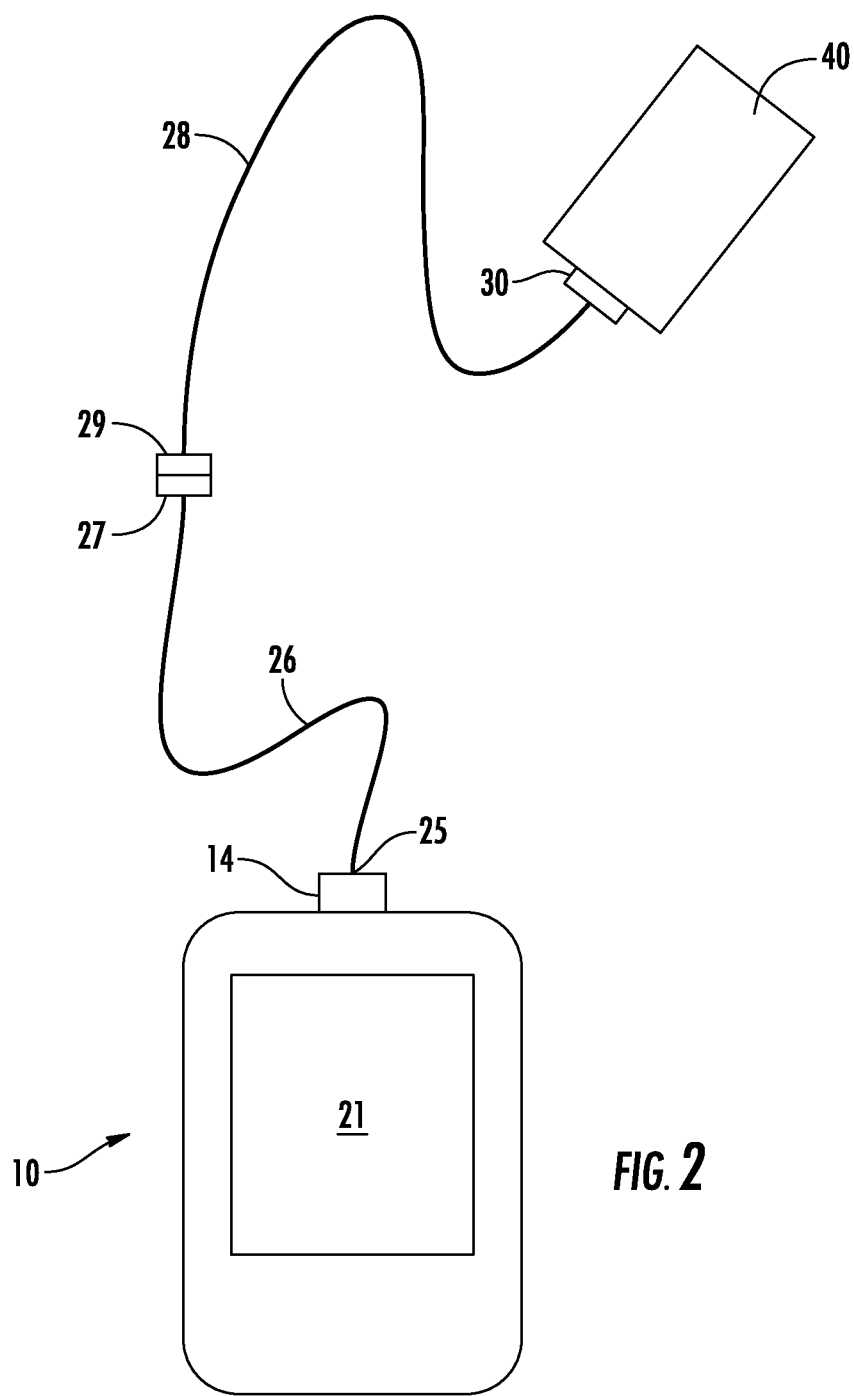
FIG. 2 provides a schematic illustration of an optical time-domain reflectometer connected to an optically reflective system in accordance with one or more example embodiments of the present disclosure.

Turning now to FIG. 2, the OTDR 10 may further include a display 21. As shown in FIG. 2, the OTDR 10 may be connected to an optical reflector 40 for measuring or determining a reference power after attenuation of a round trip without network under test of light emitted by the OTDR 10 and received by the same OTDR. In various embodiments, the optical reflector 40 may be, e.g., a mirror, an open UPC connector, or any other suitable optical reflector. The optical reflector can be reflective for all wavelengths or reflective only to selected wavelengths. The structure and function of such optical reflectors, e.g., mirrors and UPC connectors, are generally understood by those of ordinary skill in the art and, as such, are not shown or described in greater detail in the interest of clarity and brevity.

For example, the reference power may be determined when the OTDR 10 is connected to the optical reflector 40, e.g., when the OTDR 10 is connected to the optical reflector 40 without a network under test between the OTDR 10 and the optical reflector 40. As shown in FIG. 2, the OTDR 10 may be connected to the optical reflector 40 by a launch cable 26 and a receive cable 28. More specifically, a first end 25 of the launch cable 26 may be connected to the test port 14 of the OTDR 10, a second end 27 of the launch cable 26 may be connected to a second end 29 of the receive cable 28, and a first end 30 of the receive cable 28 may be connected to the optical reflector 40. In particular, the first end 25 of the launch cable 26 may be directly connected to the OTDR 10, the first end 30 of the receive cable 28 may be directly connected to the optical reflector 40, and the second end 27 of the launch cable 26 may be directly connected to the second end 29 of the receive cable 28.

With the OTDR 10 and the optical reflector 40 so connected, the reference power of the OTDR 10 may be obtained by emitting one or more light pulses into the cables 26 and 28, e.g., from the light source 16 of the OTDR 10 through the test port 14 such that the light pulse(s) are transmitted from the light source 16 of the OTDR 10 through the cables, e.g., launch cable 26 and receive cable 28, to the optical reflector 40, and measuring an optical power level of the reflections of such light pulse(s) from the optical reflector 40 with the measurement element 18 of the OTDR 10.

Figure 3:
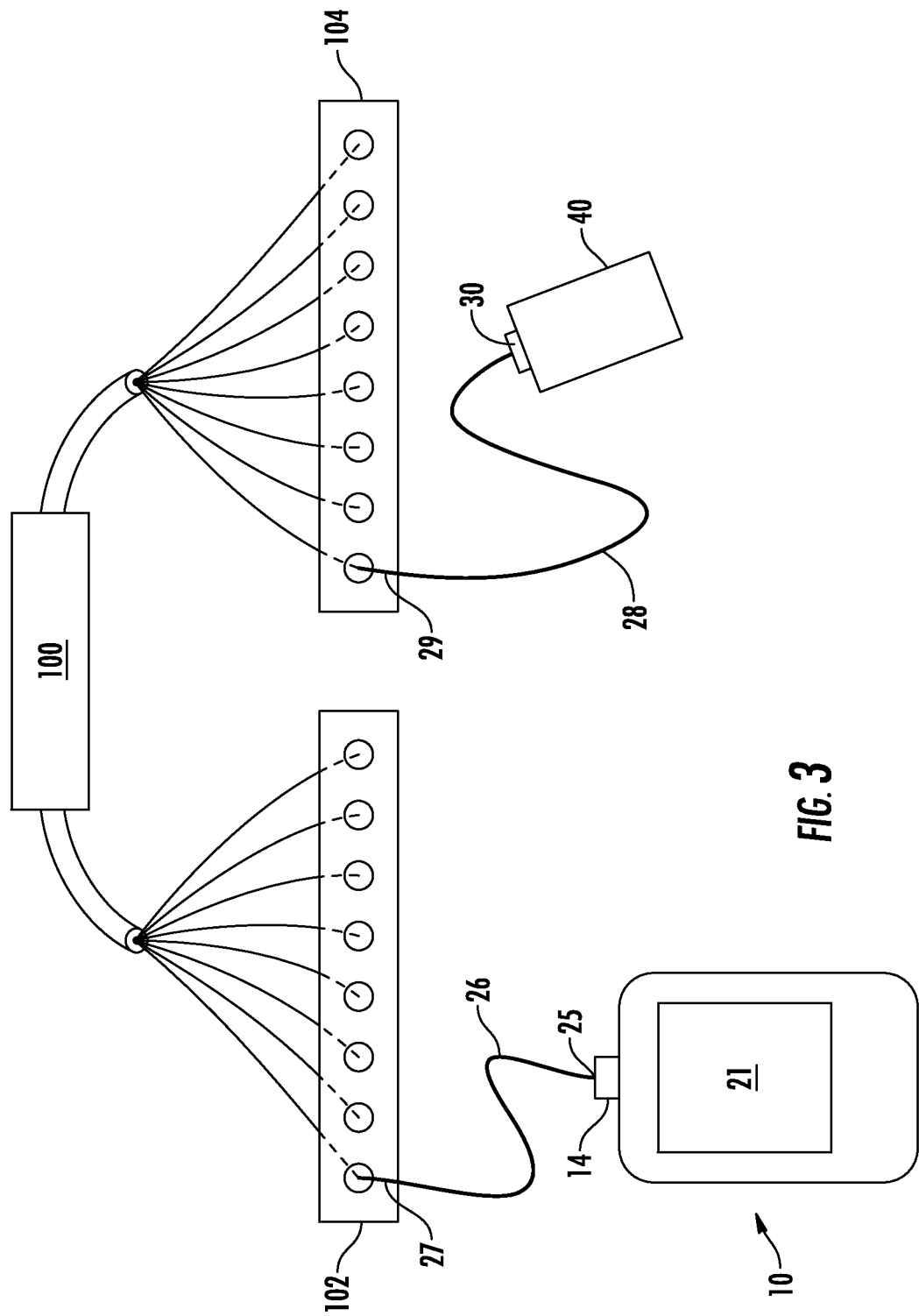
FIG. 3 provides a schematic illustration of an optical time-domain reflectometer and an optically reflective system connected to an optical network in accordance with one or more example embodiments of the present disclosure.

Turning now to FIG. 3, the OTDR 10 may be connected to an optical network under test (sometimes abbreviated NUT) 100 at a first end 102 of the optical network 100 and the optical reflector 40 may be connected to the optical network 100 at a second end 104 of the optical network 100. For example, as illustrated schematically in FIG. 3, the first and second ends 102 and 104 of the optical network 100 may be access panels at separate locations, such as separate ends, of the optical network 100. In some embodiments, the second end 104 of the optical network 100 may be opposite the first end 102 of the optical network 100. In some embodiments, connecting the OTDR 10 to the optical network 100 at the first end 102 of the optical network 100 may include connecting the second end 27 of the launch cable 26 directly to the first end 102 of the optical network 100 and connecting the optical reflector 40 to the optical network 100 at the second end 104 of the optical network 100 may include connecting the second end 29 of the receive cable 28 directly to the second end 104 of the optical network 100.

As mentioned above, the optical reflector 40 may, in various example embodiments, include a mirror or an open UPS connector. For example, in some embodiments the optical network 100 may be a high-loss network and the optical reflector 40 may be a mirror. As another example, in other embodiments, the optical network 100 may be a low-loss network and the optical reflector 40 may be an open UPC connector. It should be understood that, as used in the foregoing, the relative terms "high-loss" and "low-loss" are used with reference to one another.

With the OTDR 10, the optical reflector 40, and the optical network 100 configured and arranged, e.g., interconnected, as illustrated in FIG. 3, a return power may be obtained, e.g., the return power through the optical network 100 may be measured or determined when the OTDR 10 and the optical reflector 40 are connected to the optical network 100 as shown in FIG. 3. As is generally understood in the art, the return power may include a measured power level of a reflected light pulse returned to the OTDR 10 through the optical network 100 by the optical reflector 40.

In various embodiments, determining the return power may include transmitting one or more light pulses from the light source 16 (FIG. 1) of the OTDR 10 through the optical network 100 to the optical reflector 40, and measuring a power level of one or more reflected light pulses reflected from the optical reflector 40 through the optical network 100 to the OTDR 10 with the measurement element 18 (FIG. 1) of the OTDR 10.

Once the reference power has been obtained, e.g., using the configuration shown in FIG. 2 and described above, and the return power has been obtained, e.g., using the configuration shown in FIG. 3 and described above, the loss of the optical network 100 may be determined based on the reference power and the return power. For example, the loss of the optical network 100 may be based on a difference (ΔP) between the reference power and the return power. For example, in some embodiments, ΔP may be determined by subtracting the return power from the reference power. In some embodiments, the loss of the optical network 100 may be determined by subtracting the return power, e.g., the measured power level of the reflected light pulse, from the reference power and dividing the result of subtracting the measured power level of the reflected light pulse from the reference power by two. In such embodiments, the loss of the optical network 100 may also be expressed mathematically as:

Loss of NUT=½·ΔP

Additionally, in at least some embodiments, a trace of the optical network 100 may also be captured using the OTDR 10, e.g., after determining the loss of the optical network 100. For example, the trace of the optical network 100 may be captured using the OTDR 10 without disconnecting the OTDR 10 from the optical network 100. Methods of capturing a trace of an optical network with an optical time-domain reflectometer are generally understood by those of ordinary skill in the art and, as such, are not described in greater detail herein. Nonetheless, it should be appreciated that testing methods according to the present disclosure may be advantageous in that the trace can be captured and a loss of the optical network can be determined using a single device, e.g., OTDR 10, without the need to connect and disconnect multiple test instruments, e.g., without a separate light source and power meter for loss testing.

Figure 4:
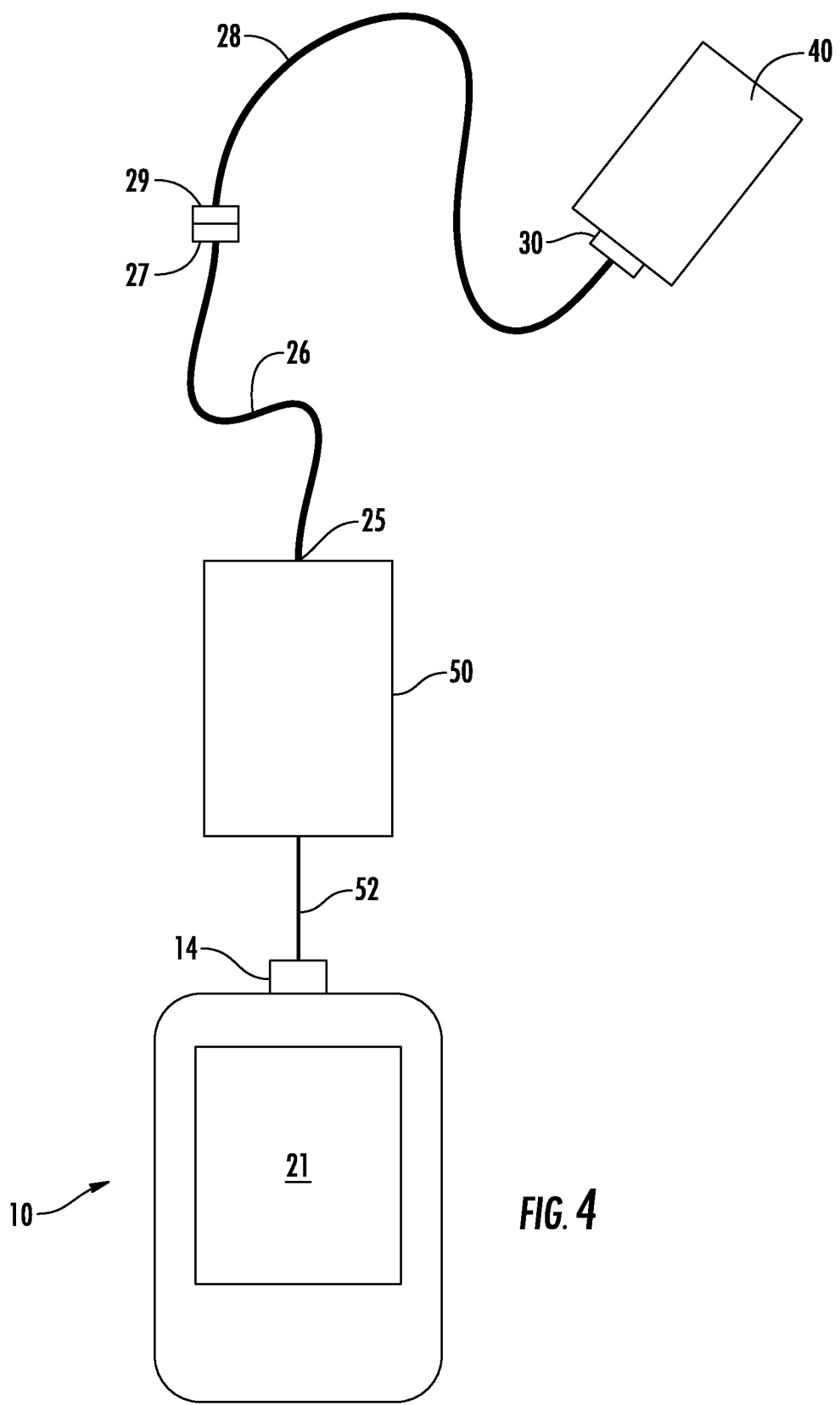
FIG. 4 provides a schematic illustration of an optical time-domain reflectometer connected to an optically reflective system in accordance with one or more additional example embodiments of the present disclosure.
Figure 5:
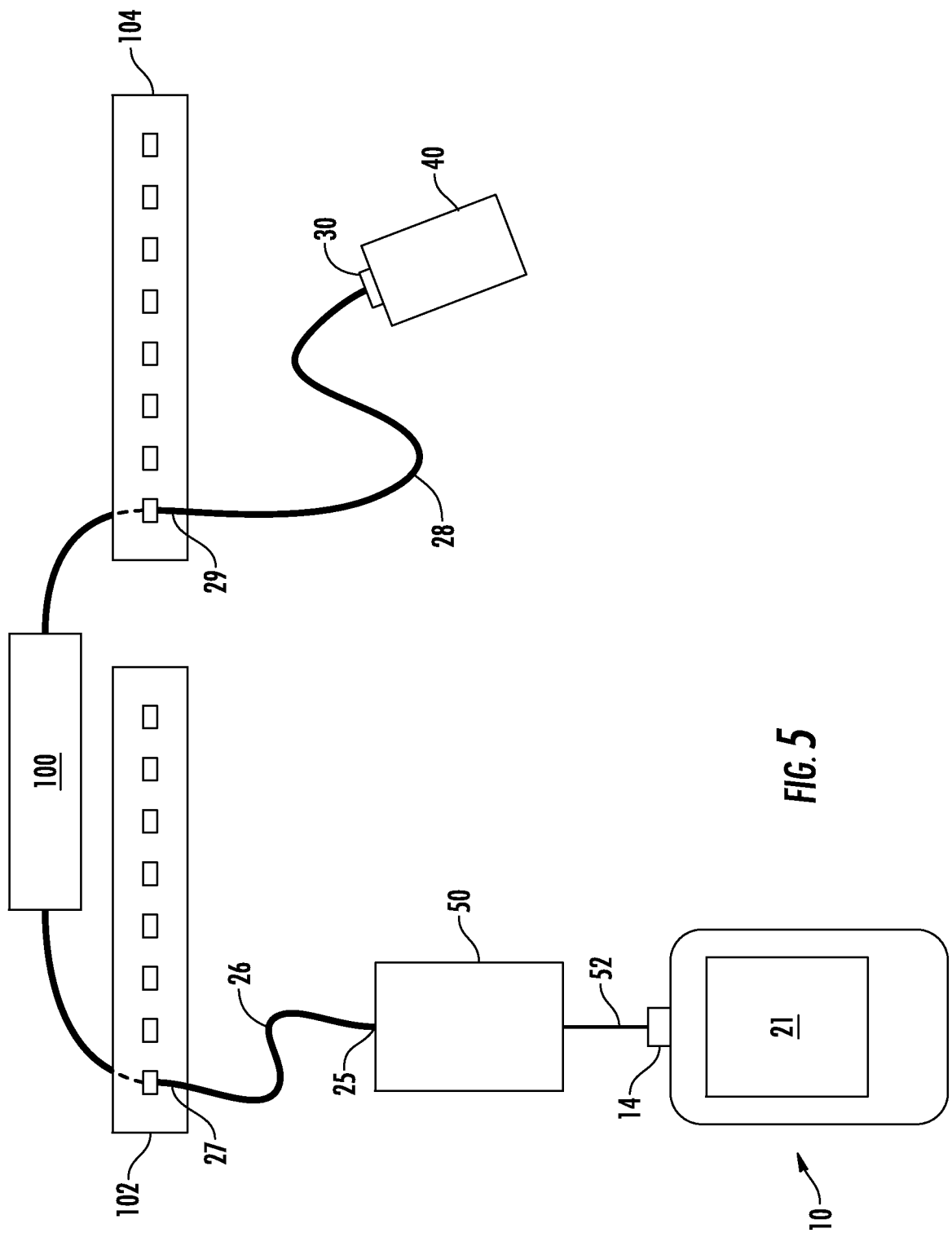
FIG. 5 provides a schematic illustration of an optical time-domain reflectometer and an optically reflective system connected to an optical network in accordance with one or more additional example embodiments of the present disclosure.

In some embodiments, the cables, e.g., the launch cable 26 and the receive cable 28, may be single-fiber cables, each of which includes only a single optical fiber, for example as illustrated in FIGS. 2 and 3. In these embodiments, the cables will include single-fiber connectors as are understood by those of ordinary skill in the art. In other embodiments, as illustrated in FIGS. 4 and 5, the cables 26 and 28 may be multiple-fiber cables each of which includes a plurality of optical fibers. In these embodiments, the cables may include multiple-fiber connectors, such as Multiple-Fiber Push-On ("MPO") connectors.

In multiple-fiber embodiments, additional components may be included to facilitate the various connections. For example, as shown in FIG. 4, in embodiments where the cables 26 and 28 are multi-fiber cables, the OTDR 10 may be connected to the MPO launch cable 26 through a multiplexer 50 and a jumper cable 52. The jumper 52 may be a single-fiber cable and the multiplexer 50 may facilitate an operative connection of the test port 14 and the single-fiber jumper 52 with the multiple fibers within the multi-fiber launch cable 26 in this embodiment.

One of skill in the art will recognize that an MPO cable is a multi-fiber cable having at least one MPO connector, and that such cables are but one example of possible multi-fiber cables usable with various embodiments of the present disclosure.

Other than the addition of the jumper cable 52 and the multiplexer 50, the configuration and operation of the OTDR 10 and the optical reflector 40 shown in FIGS. 4 and 5, as well as the optical network 100 shown in FIG. 5, is generally the same as described above with respect to FIGS. 2 and 3. In order to shorten test time, N identical sets of test hardware can be used, so M fibers can be test in N groups simultaneously using N multiplexers. The multiplexers can have a ratio of at least M/N.

For example, the reference power may be obtained with the configuration depicted in FIG. 4 and may include transmitting one or more light pulses from the light source 16 of the OTDR 10 to the optical reflector 40 without an optical network under test between the OTDR 10 and optical reflector 40, e.g., with the OTDR 10 and the optical reflector 40 connected by the launch cable 26 and receive cable 28 as described above with respect to FIG. 2, with the exception that the jumper cable 52 may be directly connected to the test port 14 and directly connected to the multiplexer 50, and the first end 25 of the launch cable 26 may be directly connected to the multiplexer 50. Accordingly, in such embodiments, the first end 25 of the launch cable 26 may be indirectly connected to the OTDR 10, e.g., via the multiplexer 50 and the jumper cable 52. Thus, the reference power may be determined by measuring an optical power of one or more reflected light pulses received by the OTDR 10 from the optical reflector 40 without an optical network therebetween, e.g., when the OTDR 10 and optical reflector 40 are connected only by the cables 26, 28, and 52, and the multiplexer 50. In certain instances when a multiplexer is used, each branch can have a separated reference power level.

As another example, the return power may be obtained or determined using the configuration illustrated in FIG. 5 in a similar manner as described above with respect to FIG. 3. Further, the loss of the optical network 100 may then be obtained based on the reference power and the return power determined using the configurations of FIGS. 4 and 5. For example, the same mathematical relationship described above may be used, e.g., Loss of NUT=½·ΔP. It should be noted that the reference power and the return power used to determine ΔP are generally equivalent, such that the only change from the configuration used to determine the reference power to the configuration used to determine the return power is the presence of the optical network 100 (or at least a portion thereof) between the OTDR 10 and the optical reflector 40. For example, the reference power obtained according to the configuration of FIG. 2 would be used with the return power obtained according to the configuration of FIG. 3 and the reference power obtained according to the configuration of FIG. 4 would be used with the return power obtained according to the configuration of FIG. 5.

Figure 6:
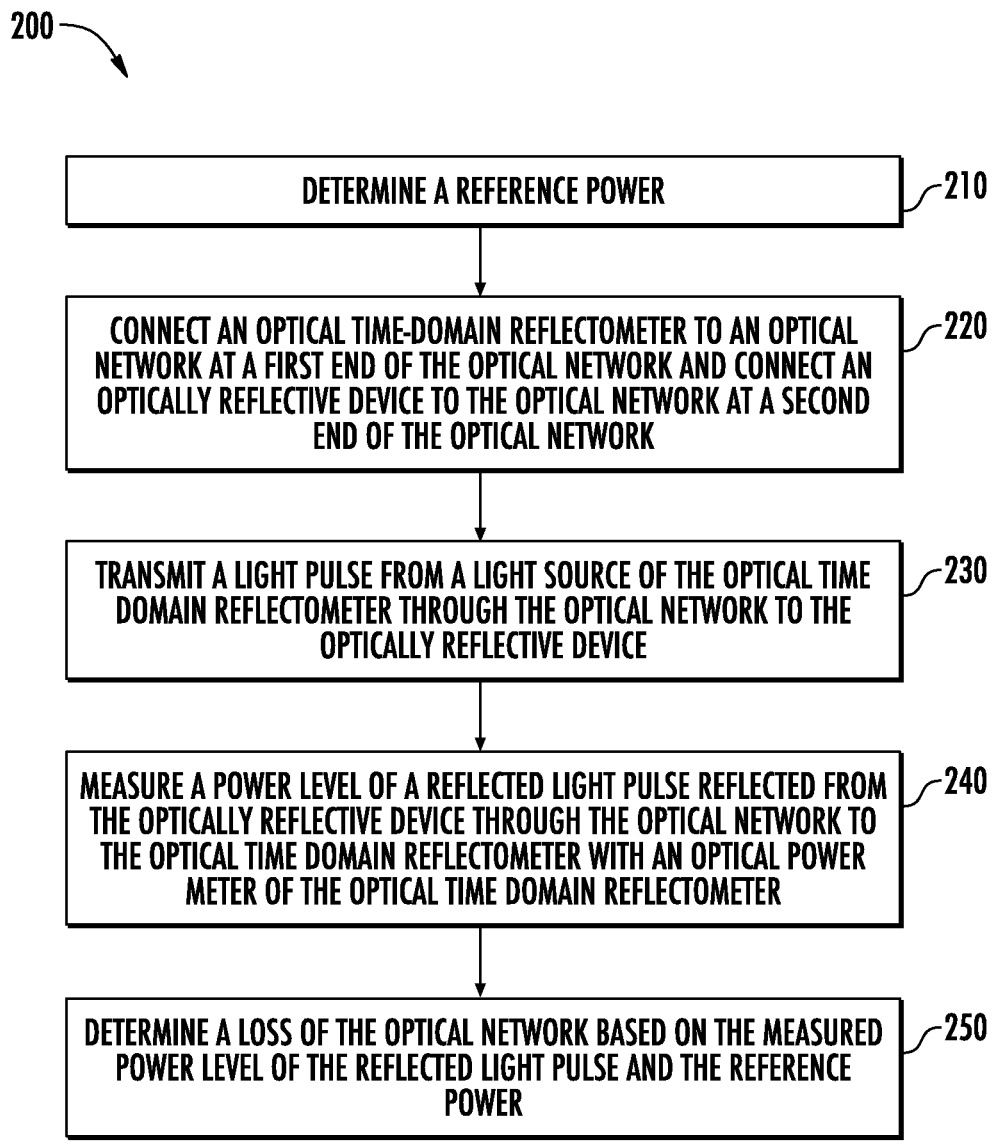
FIG. 6 provides a flowchart illustrating a method of testing an optical network with an optical time-domain reflectometer in accordance with one or more example embodiments of the present disclosure.

FIG. 6 illustrates one example method 200 of testing an optical network with an optical time-domain reflectometer, such as the OTDR 10 shown and described herein. As shown in FIG. 6, the method 200 may include a step 210 of determining a reference power. For example, the reference power determined at step 210 may be the reference power of the OTDR 10 described above with reference to FIG. 2 or FIG. 4. In some example embodiments, determining the reference power may include connecting the optical time-domain reflectometer to the optical reflector, e.g., without the optical network therebetween as illustrated in FIG. 2 or FIG. 4. Determining the reference power may also include transmitting a light pulse from the light source of the optical time-domain reflectometer to the optical reflector and measuring a power level of a reflected light pulse reflected from the optical reflector to the optical time-domain reflectometer with the optical power meter of the optical time-domain reflectometer, while the optical time-domain reflectometer and the optical reflector are so connected.

Turning again to FIG. 6, the method 200 may also include determining a return power through the optical network. For example, the method 200 may include a step 220 of connecting the optical time-domain reflectometer to an optical network at a first end of an optical fiber of the optical network and connecting an optical reflector to the optical network at a second end of the optical fiber opposite the first end of the optical fiber, a step 230 of transmitting a light pulse from a light source of the optical time-domain reflectometer through the optical network to the optical reflector, and a step 240 of measuring a power level of a reflected light pulse reflected from the optical reflector through the optical network to the optical time-domain reflectometer with a measurement element, such as an optical power meter, of the optical time-domain reflectometer.

The method 200 may further include a step 250 of determining a loss of the optical network based on the measured power level of the reflected light pulse and the reference power. As mentioned above, the loss of the optical network may be based on a difference of the measured power level of the reflected light pulse from the reference power. For example, the loss of the optical network may be determined by subtracting the measured power level of the reflected light pulse from the reference power and dividing the result of subtracting the measured power level of the reflected light pulse from the reference power by two.

Figure 7:
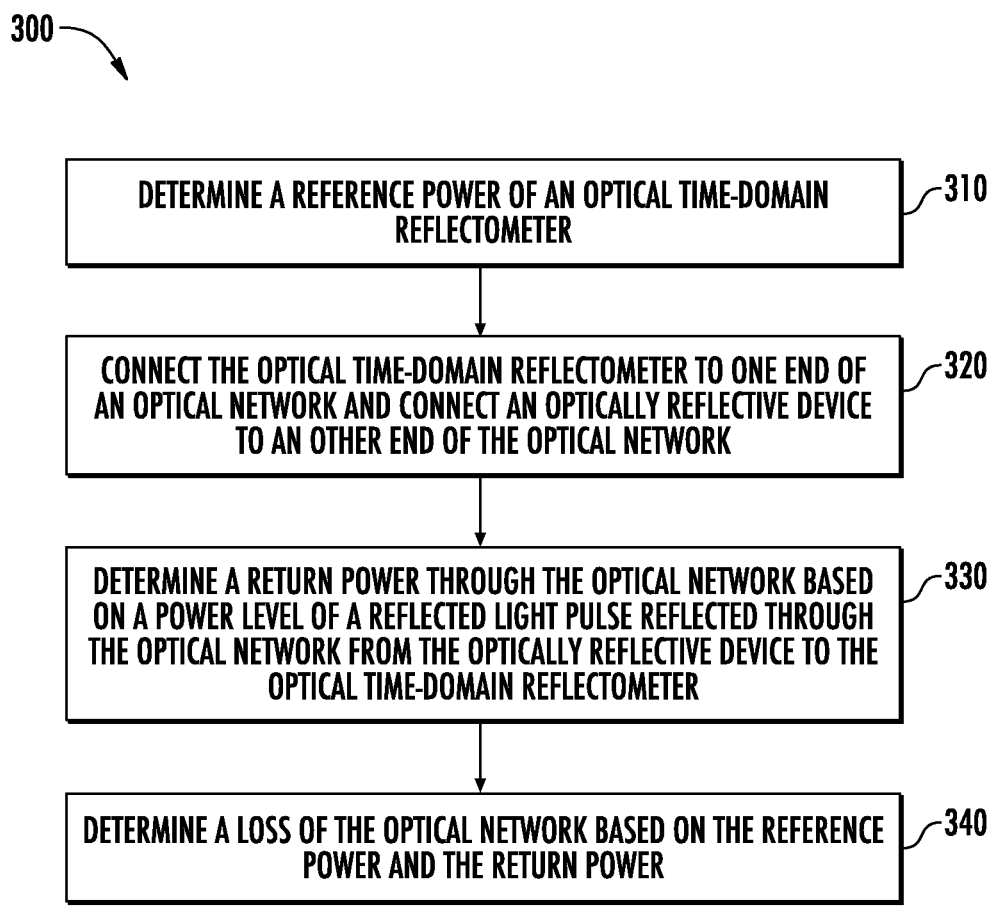
FIG. 7 provides a flowchart illustrating a method of testing an optical network with an optical time-domain reflectometer in accordance with one or more additional example embodiments of the present disclosure.

FIG. 7 illustrates another example method 300 of testing an optical network with an optical time-domain reflectometer. The method 300 may include a step 310 of determining a reference power of the optical time-domain reflectometer based on a power level of a reflected light pulse reflected from an optical reflector, e.g., as described above with reference to FIGS. 2 and 4. The method 300 may also include a step 320 of connecting the optical time-domain reflectometer to one end of an optical fiber in the optical network and connecting the optical reflector to an opposite end of the optical fiber after the step 310 of determining the reference power. The method 300 may further include a step 330 of determining a return power through the optical network based on a power level of a reflected light pulse reflected through the optical network from the optical reflector to the optical time-domain reflectometer. Additionally, method 300 may include a step 340 of determining a loss of the optical network based on the reference power and the return power. The loss may be determined with a loss test accuracy error of less than 0.1 dB, such as less than 0.08 dB, such as less than 0.06 dB, such as less than 0.05 dB, such as less than 0.04 dB, such as less than 0.03 dB. As used herein, the loss test accuracy error may measure an amount of error resulting from the herein described method of testing the optical system. The measured return loss may be calculated by comparing the measured loss to actual loss in the optical network, e.g., as measured by a known, calibrated device such as a power meter with a separate light source. The known, calibrated device may be deployed to test the optical system by positioning the power meter on a first end of the optical system and the separate light source on the opposite side of the optical system. In certain instances, the lost test accuracy error of the loss test may be caused at least in part by an optical reflector used for performing the loss test. More specifically, the loss test accuracy error may be caused at least in part by a loss incurred by the optical reflector. It is noted that traditional loss testing performed with optical time-domain reflectors (OTDR) return optical loss test values in excess of 0.1 dB as OTDR devices are not ideally equipped to accurately measure the loss in an optical system. Moreover, traditional loss tests are performed using light sources and power meters disposed on opposite sides of the optical fiber being measured, thus requiring use of multiple devices, such as multiple active devices, e.g., a separate power meter and light source setup.

In some embodiments, the device used to perform the method 200 and/or the method 300 may be further configured to perform a length test to determine the length of one or more optical fibers in the optical network. The device may perform the trace, optical loss test, and length test all while remaining connected with the optical network, e.g., throughout each operation and without disconnecting.

In some embodiments, the device used to perform the method 300 may remain connected to the optical network between and during the step 320 of connecting the optical time-domain reflectometer to one end of the optical fiber in the optical network and the step 340 of determining the loss of the optical network based on the reference power and the return power. In this regard, the device may not be swapped with another device. In a further embodiment, the method 300 may be performed in its entirety without requiring switching of optical pathways, e.g., using an optical switch. Similarly, the method 200 may also be performed without disconnecting or swapping the OTDR or device and without using an optical switch. In such a manner, the device 10 used in accordance with embodiments described herein may include a discrete, single-unit device, i.e., not a power meter and separate light source positioned on opposite ends of the optical fiber of the optical network.

In light of the foregoing, it should be understood that the light source and power meter arrangement used for determining the loss of the optical network in the various embodiments of the present disclosure is different from a traditional light source power meter loss measurement setup. Specifically, traditional light source power meter loss setups are capable of performing only loss tests. These traditional setups are incapable of performing, for example, event tracing testing in an optical network. Moreover, it should be understood that the device used for testing optical networks in the various embodiments of the present disclosure is different from a traditional OTDR setup as far as its optical loss detection capability and low accuracy error. Specifically, OTDR setups are incapable of measuring optical loss with low accuracy error. Thus, technicians and line operators are traditionally required to carry both light source power meter loss setups and OTDR setups when performing complex functions on the optical network. Such requirements increase cost and time of network testing. Moreover, for large optical networks, traditional light source power meter loss setups require operators on both sides of the optical fiber. The methods associated with the device described herein in accordance with one or more embodiments may be performed by a single technician. Specifically, by using an optical reflector, the technician may perform all activities associated with optical testing at a single end of the optical fiber, thereby eliminating the need for additional technicians.

Those of ordinary skill in the art will appreciate that testing methods described herein provide numerous advantages over the prior art. For example, the loss measurement methods of the present disclosure may provide a better accuracy due to the division by two in the loss calculation, which reduces any hardware impairment by a factor of two. As another example, the present methods are less dependent on the backscatter coefficient of the optical fiber as compared to traditional OTDR methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of testing an optical network with an optical time-domain reflectometer, the method comprising:
   determining a reference power;
   connecting the optical time-domain reflectometer to the optical network at a first end of the optical network and connecting an optical reflector to the optical network at a second end of the optical network opposite the first end of the optical network;
   transmitting a light pulse from a light source of the optical time-domain reflectometer through the optical network to the optical reflector;
   measuring a power level of a reflected light pulse reflected from the optical reflector through the optical network to the optical time-domain reflectometer with an optical power meter of the optical time-domain reflectometer; and
   determining a loss of the optical network based on the measured power level of the reflected light pulse and the reference power.

2. The method of claim 1, wherein the loss of the optical network is determined by subtracting the measured power level of the reflected light pulse from the reference power and dividing the result of subtracting the measured power level of the reflected light pulse from the reference power by two.

3. The method of claim 1, wherein determining the reference power comprises:
   connecting the optical time-domain reflectometer to the optical reflector;
   transmitting a light pulse from the light source of the optical time-domain reflectometer to the optical reflector; and
   measuring a power level of a reflected light pulse reflected from the optical reflector to the optical time-domain reflectometer with the optical power meter of the optical time-domain reflectometer.

4. The method of claim 3, wherein connecting the optical time-domain reflectometer to the optical reflector comprises connecting a first end of a launch cable directly to the optical time-domain reflectometer, connecting a first end of a receive cable directly to the optical reflector, and connecting a second end of the launch cable directly to a second end of the receive cable.

5. The method of claim 4, wherein connecting the optical time-domain reflectometer to the optical network at the first end of the optical network comprises connecting the second end of the launch cable directly to the first end of the optical network and wherein connecting the optical reflector to the optical network at the second end of the optical network comprises connecting the second end of the receive cable directly to the second end of the optical network.

6. The method of claim 1, further comprising capturing a trace of the optical network with the optical time-domain reflectometer.

7. The method of claim 6, wherein the optical time-domain reflectometer is not disconnected from the optical network between or during the steps of determining the loss of the optical network and capturing the trace of the optical network.

8. The method of claim 1, wherein the light source of the optical time-domain reflectometer comprises a pulse generator and a laser driven by the pulse generator.

9. The method of claim 1, wherein the optical power meter of the optical time-domain reflectometer comprises an avalanche photodiode.

10. The method of claim 1, wherein the optical network is a high-loss network and the optical reflector is a mirror.

11. The method of claim 1, wherein the optical network is a low-loss network and the optical reflector is an open UPC connector.

12. A method of testing an optical network with an optical time-domain reflectometer, the method comprising:
   determining a reference power of the optical time-domain reflectometer based on a power level of a reflected light pulse reflected from an optical reflector;
   connecting the optical time-domain reflectometer to one end of the optical network and connecting the optical reflector to an opposite end of the optical network after determining the reference power;
   determining a return power through the optical network based on a power level of a reflected light pulse reflected through the optical network from the optical reflector to the optical time-domain reflectometer; and
   determining a loss of the optical network based on the reference power and the return power.

13. The method of claim 12, wherein the loss of the optical network is determined by subtracting the return power from the reference power and dividing the result of subtracting the return power from the reference power by two.

14. The method of claim 12, wherein determining the reference power comprises:
   connecting a first end of a launch cable directly to the optical time-domain reflectometer;
   connecting a first end of a receive cable directly to the optical reflector;
   connecting a second end of the launch cable directly to a second end of the receive cable;
   transmitting a light pulse from a light source of the optical time-domain reflectometer through the launch cable and the receive cable to the optical reflector; and
   measuring a power level of a reflected light pulse reflected from the optical reflector through the launch cable and the receive cable to the optical time-domain reflectometer with an optical power meter of the optical time-domain reflectometer;
   and wherein connecting the optical time-domain reflectometer to the one end of the optical network comprises connecting the second end of the launch cable directly to the one end of the optical network and wherein connecting the optical reflector to the opposite end of the optical network comprises connecting the second end of the receive cable directly to the opposite end of the optical network.

15. The method of claim 12, further comprising capturing a trace of the optical network with the optical time-domain reflectometer after determining the loss of the optical network.

16. The method of claim 15, wherein the optical time-domain reflectometer is not disconnected from the optical network after determining the loss of the optical network and before capturing the trace of the optical network.

17. An optical time-domain reflectometer, comprising:
a light source;
an optical power meter; and
a controller, the controller configured for:
  determining a reference power based on a power level of a reflected light pulse reflected from an optical reflector;
  transmitting a light pulse from a light source of the optical time-domain reflectometer through an optical network to the optical reflector;
  measuring a power level of a reflected light pulse reflected from the optical reflector through the optical network to the optical time-domain reflectometer with an optical power meter of the optical time-domain reflectometer; and
  determining a loss of the optical network based on the measured power level of the reflected light pulse reflected through the optical network and the reference power.

18. The optical time-domain reflectometer of claim 17, wherein the controller is configured for determining the loss of the optical network by subtracting the measured power level of the reflected light pulse reflected through the optical network from the reference power and then dividing the result of subtracting the measured power level of the reflected light pulse reflected through the optical network from the reference power by two.

19. The optical time-domain reflectometer of claim 17, wherein the controller is configured for determining the reference power when the optical time-domain reflectometer is connected to a launch cable, the launch cable is directly connected to a receive cable, and the receive cable is connected to the optical reflector.

20. The optical time-domain reflectometer of claim 17, wherein the light source comprises a pulse generator and a laser driven by the pulse generator.

* * * * *